Oct. 31, 1967  B. FLORIN ET AL  3,349,882
CIPHERING MACHINE
Filed May 17, 1966  6 Sheets-Sheet 3
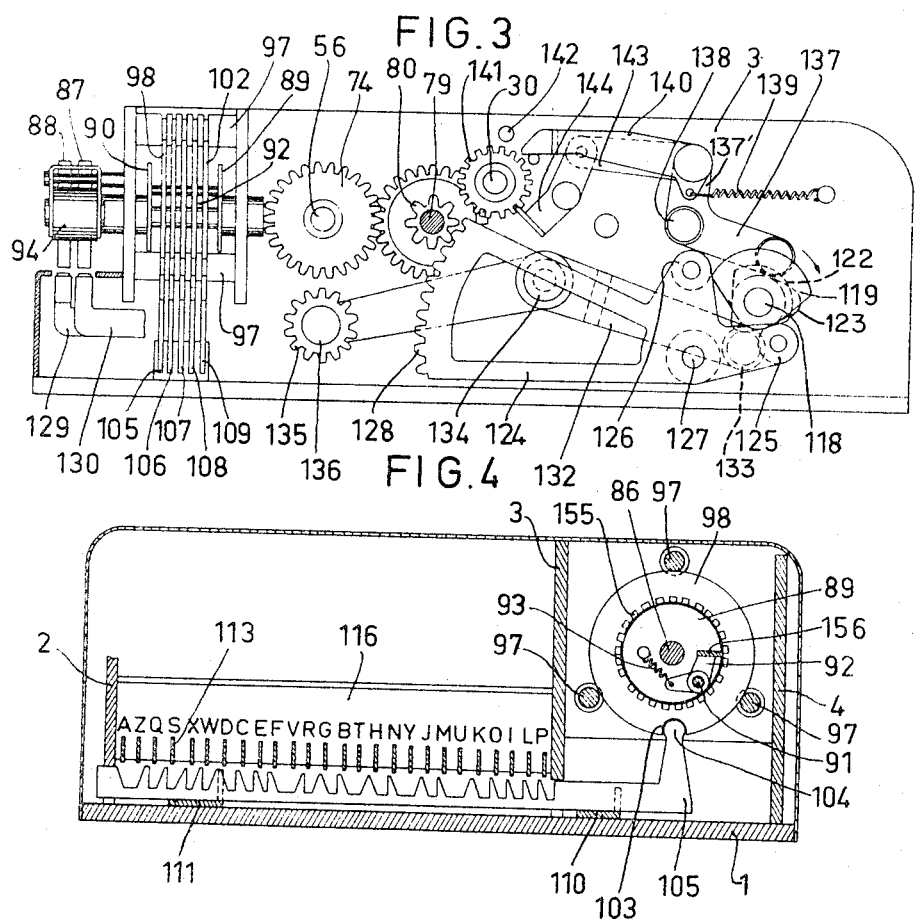
INVENTORS
BENGT FLORIN
BY KALEVI LOIMARANTA
ATTORNEYS

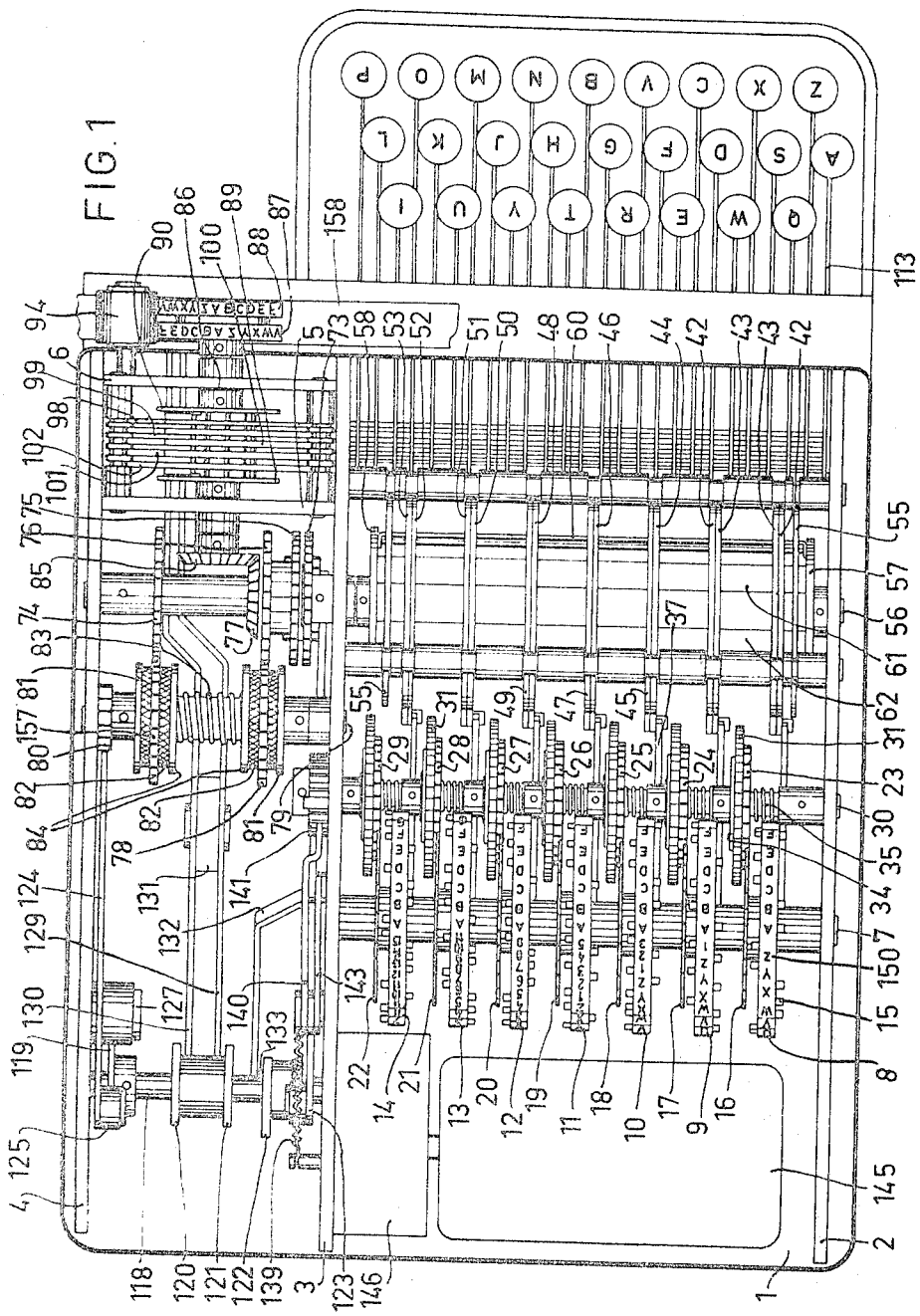

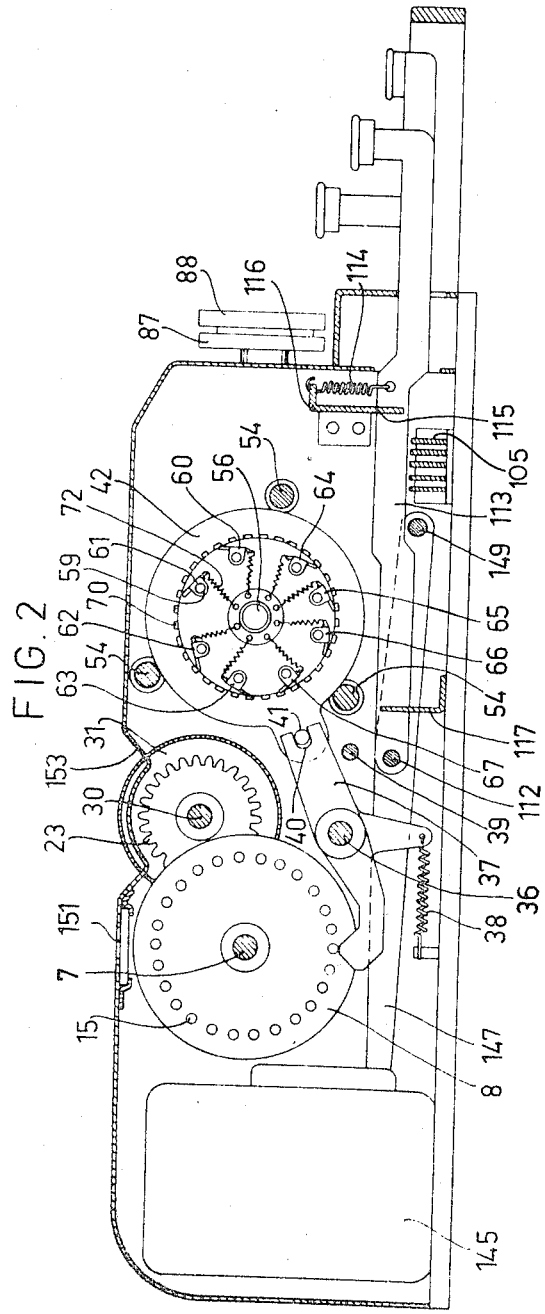

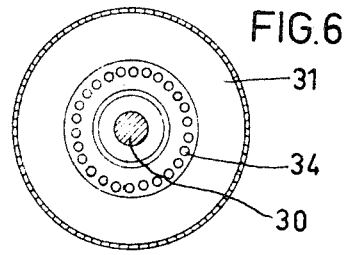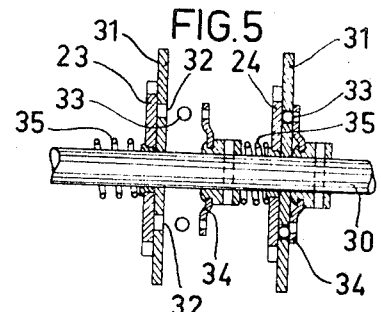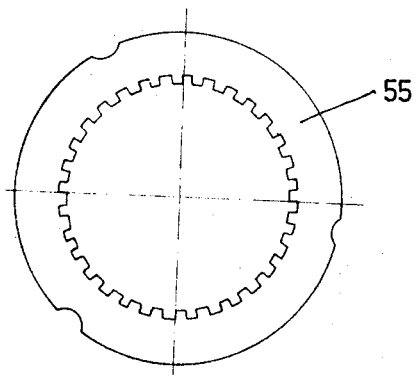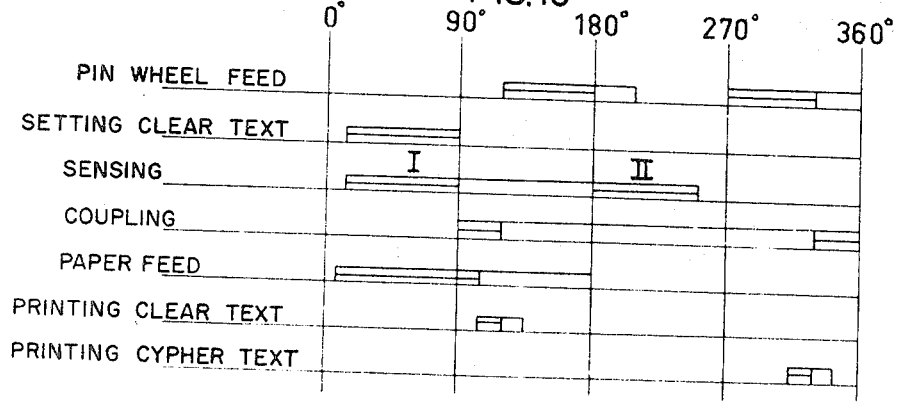

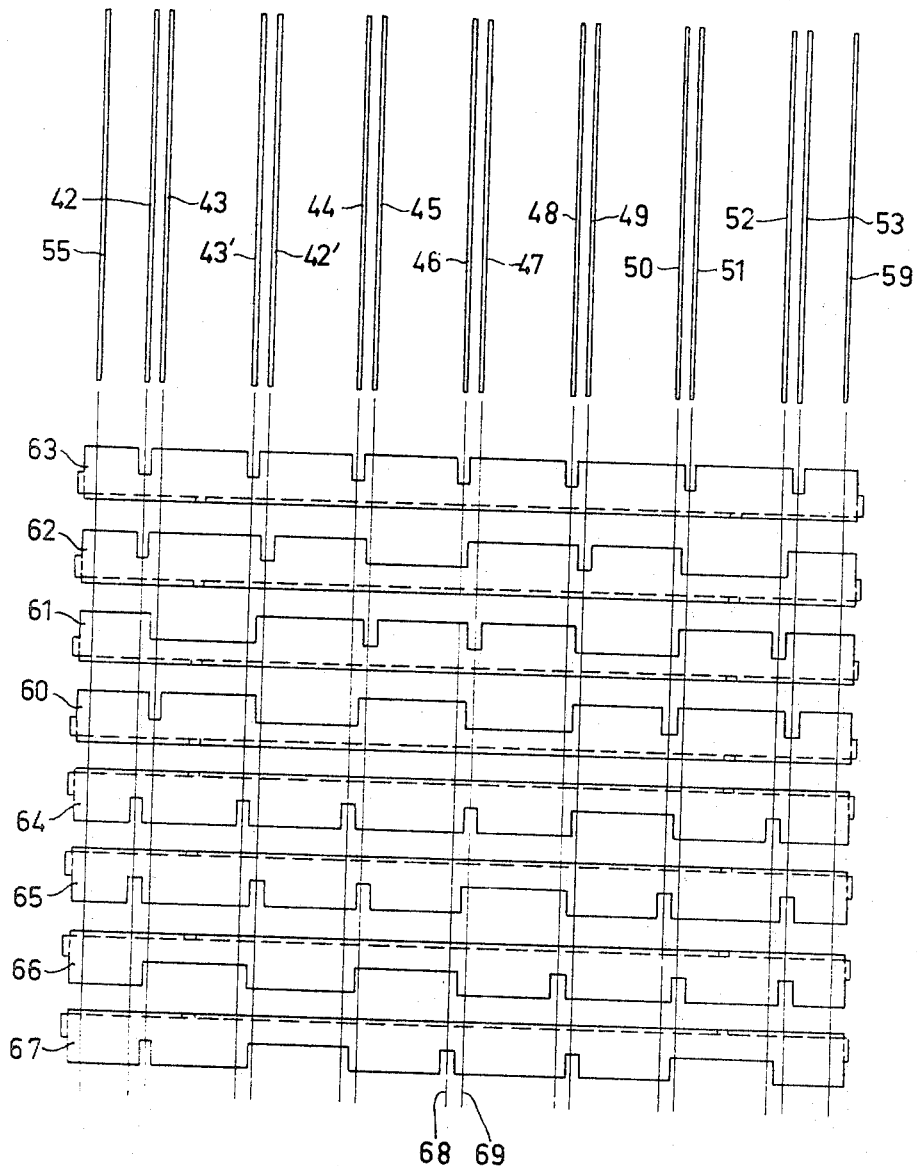

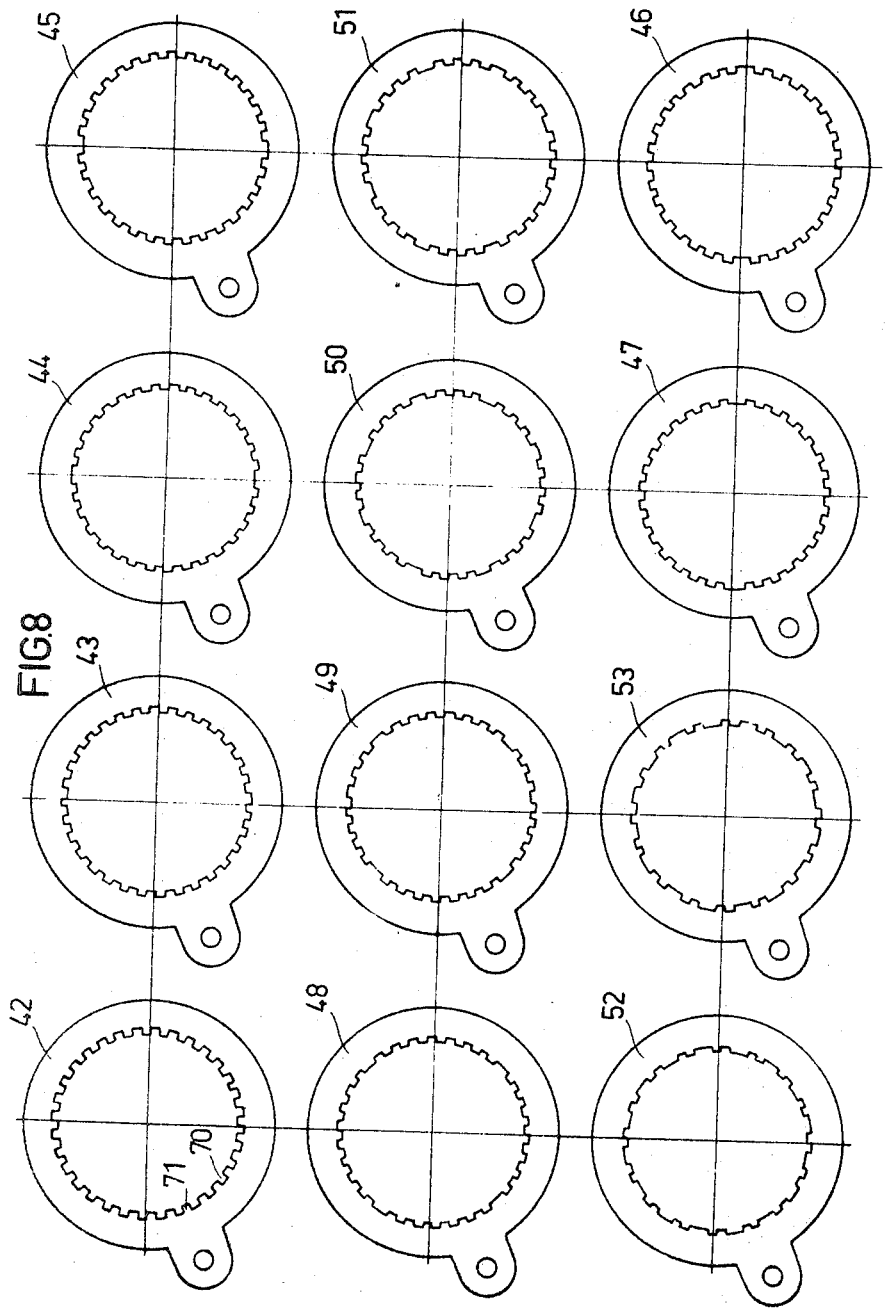

United States Patent Office 3,349,882
Patented Oct. 31, 1967

3,349,882
CIPHERING MACHINE
Bengt Florin, Hagersten, and Kalevi Loimaranta, Mattby, Sweden, assignors to AB Transvertex, Varby, Sweden, a joint-stock company of Sweden
Filed May 17, 1966, Ser. No. 550,680
8 Claims. (Cl. 197—4)

ABSTRACT OF THE DISCLOSURE

There is disclosed herein a ciphering machine of the type in which the displacement of a ciphered letter from the corresponding letter in the clear text is variable, the amount of displacement being determined by the settings of a plurality of pin-wheels, the numbers of teeth of which have no common denominator, i.e., are relatively prime. During each cycle the wheels are moved through one tooth space simultaneously so that the displacement of each letter in a clear or cipher text may be equal to, greater, or lesser than was that of the preceding character. However, there are patterns formed by repetitions of the position of the individual pin-wheels which make it possible for expert cryptographers to decode messages.

This disclosure sets forth a mechanism, including probing or sensing means, for making each displacement of a cipher letter relative to its clear text letter, dependent upon two successive settings of the controlling pin-wheels or gear wheels, and thus minimizes the possibility that patterns of cycles of the individual wheels will aid in unauthorized decoding.

---

The present invention relates to ciphering machines of the type wherein clear text is modified by a displacement series produced by the machine, in such a manner, that during the ciphering operation a varying displacement figure is added to each of the clear text letters and that during the de-ciphering operation the respective displacement figure is subtracted from the cipher letter. The cryptographic safety of such machines depends, of course, intimately on the manner in which the displacement series is produced by the machine.

In conventional machines of the said type the displacement series is formed by a number of so-called pin-wheels the pins of which can be set in active or passive positions for actuating a selector mechanism adapted to select the displacement figure corresponding to the setting of the pin-wheel in question. By utilizing pin-wheels with a large number of divisions and/or a larger number of pin-wheels with a mutually relative prime number in respect to the division, it is easy to produce very long displacement series without repetition but, so far, no one has succeeded in preventing the individual cycles of every pin-wheel leaving individual marks in the displacement series, i.e., an active or passive pin on a wheel which returns to operating position after having completed one revolution effects a definite function in the selector mechanism.

The present invention has as its objects to eliminate the said shortcoming. This object is achieved in that the pin on an individual pin-wheel, irrespective of whether the pin is in active or passive position, actuates the selector mechanism in dependence on the operative pins of other pin-wheels, in such a manner, that if the pin of one pin-wheel changes its operating position from active to passive, or vice versa, the displacement figure formed is not changed by a constant, but in dependence on the operative pins of the other pin-wheels.

An embodiment of the invention is illustrated in the following description and on the accompanying drawings whereon FIG. 1 is a top plan view of the ciphering machine, with its case removed;
FIG. 2 is an elevational view of the machine from the left side, the left-hand end wall being removed;
FIG. 3 is an elevational view from the right side, the outer right-hand end wall being removed;
FIG. 4 is a front view, the key-board and the printing device being removed;
FIGS. 5 and 6 are detail views of the setting mechanism of the pin-wheels;
FIG. 7 is a schematic view showing portions of the selector mechanism for displacement figures of the machine;
FIG. 8 is a detailed view of the combination discs of the selector mechanism;
FIG. 9 is a detailed view illustrating the design of two guide discs comprised in the selector mechanism, and,
FIG. 10 is a timing chart showing the time schedule of the machine during one machine cycle.

The machine is constructed in the following manner. On a base plate 1 are mounted three end walls 2, 3 and 4. Between the end walls 3 and 4 two end walls 5 and 6 are mounted. On a shaft 7 between the end walls 2 and 3 are rotatably mounted seven pin-wheels 8–14 with the divisions 26, 27, 29, 31, 35, 37 and 41 and with pins 15 adjustable in two positions for each division. Each of the pin-wheels, besides, is rigidly connected with a gear wheel 16–22 each of which has a number of teeth equal to the number or divisions of the pin-wheel with which it is associated. The said gear wheels are in constant engagement with gear wheels 23–29 all of which are rotatably mounted on a drive shaft 30. Each of the gear wheels 23–29 has the same number of teeth as the others, which teeth however are of different pitch corresponding to the pitch of teeth of gears 16–22 with which they mesh. Gear wheels 23–29 are rigidly connected with setting discs 31 which are serrated on their peripheries and provided with a number of holes 32 corresponding to the division or number of teeth of the gear wheels 23–29 (FIGS. 5 and 6), the diameter of the holes being somewhat larger than that of balls 33. For each of the said setting discs 31 a corresponding pressure plate 34 is fixed for rotation with the drive shaft 30, each of said pressure plates having the same number of holes as the setting disc 31 and on the same circumference but with a diameter somewhat smaller than that of the balls 33. Compression springs 35 are provided for keeping the setting discs 31 together with their gear wheels 23–29, pressed against the pressure plates 34. As all gear wheels 23–29 have the same division, all setting discs 31 and pressure plates 34 are of identical design.

Seven identical arms 37 are mounted rotatably on a shaft 36 and are urged to turn in a clockwise direction by action of springs 38. The said arms are adapted to assume one or the other of two angular positions. When actuated by the pins 15, the arms 37 assume the position shown in FIG. 2. In the absence of actuation by any of the pins 15, the arms are individually rotated by respective springs 38 to a position abutting a stop rod 39. Each arm 37 is at one end provided with a fork 40 adapted to engage a pin 41. Each pin 41 is rigidly connected with a pair of combination discs of the group of discs 42–53 having internal recesses 70. The combination discs 42–53 are arranged in groups of two, in such a manner, that the two combination discs in each group are rigidly connected with one another. The combination discs are etxernally and rotatably supported on three grooved rods 54. Since combination discs 42–53 are adapted to be actuated by the arms 37 via the pins 41, it is understood that each pair can be set in one or the other of two positions, according to the setting of the pins 15. At either end of the set of combination discs 42–53, a fixed guide disc 55 is mounted in grooves on the rods 54.

On a shaft 56 rotatably mounted between the end walls 2 and 4 and extending through the combination discs 42–53 and the guide discs 55, two discs 57 and 58 are mounted. Extending between discs 57 and 58 are eight shafts 59 each with one of eight probing or sensing means 60–67 mounted thereon, the probing means being provided with recesses 68 or no recesses 69 which cooperate with internal recesses 70 in the combination discs 42–53. By action of springs 72 four of the said probing means 60–63 tend to turn in clockwise direction, the remaining four probing means 64–67 tending to turn in anti-clockwise direction about their shafts 59.

The combination discs 42–53 are constructed so that, at a mutual combination as appearing from FIGS. 1 and 7 (i.e. the groups of the combination discs 7 each comprising two discs are arranged according to the scheme 42–43, 43'–42', 44–45, 46–47, 48–49, 50–51, 52–53) the discs together with the two guide discs 55 at every imaginable combination of active or passive pins 15 actuating the arms 37 leave only one possibility for any of the probing members 60–63 to be stopped during rotation of the shaft 56 in anti-clockwise direction through one revolution. The said recesses 70 in the combination discs, furthermore, are so arranged that, depending on the actuation of the combination discs 42–53 by the pins 15, thirty-two possible positions can develop at the rotation of the shaft 56 in anti-clockwise direction for stopping any of the probing members 60–63, and thirty-two possible positions at the rotation of the shaft 56 in clockwise direction for any of the probing members 64–67. This means, that at each combination of active or passive pins 15 positions of the combination discs 42–53 are arrived at in which position any of the probing members 60–63 and 64–67 respectively through its recesses 68 and non-recesses 69 cooperates with the recesses 70 of the combination discs 42–53, so that the non-recesses 69 of the probing members 60–63 and 64–67 respectively engage under urge of the springs 72 with a row of recesses 70 and thereby stop the rotation of the shaft 86.

On the portion of the shaft 56 which is located between the end walls 3 and 4 a coupling wheel 73 and a drive wheel 74 are fixed and there is further mounted rotatably on said shaft portion a gear wheel combination comprising a coupling wheel 75, a drive wheel 76 and a conical pinion 77, all of these elements being rigidly connected with each other. Drive wheels 74 and 76 mesh with pinions 78 and 157 respectively, the pinions being rotatably mounted on a shaft 79 which in its turn is supported rotatably between the end walls 3 and 4. On the shaft 79 are also rigidly mounted a gear wheel 80 and two discs 81. The pinions 78 and 157 are provided on each side with friction discs 82 which by action of a compression spring 83 via two pressure plates 84 are pressed against both sides of the pinions 78 and 157. The conical pinion 77 meshes with another conical pinion 85 having the same number of teeth and being rigidly mounted on a shaft 86 which is mounted rotatably between the end walls 5 and 6. Shaft 86 supports at its opposite end two fixed type-wheels, a clear text type-wheel 88 and a cipher type-wheel 87, the type-wheels being provided with inversely arranged printing alphabets. On said shaft 86 are also mounted two discs 89 and 90 carrying between them a shaft 91 with a probing member 92 rotatably mounted thereon, which probing member under action of a spring 93 tends to move in clockwise direction (FIG. 4). For inking the type-wheels an ink roll 94 is mounted rotatably on a cradle 95 which in its turn is rotatably mounted on a shaft 96 and by action of a spring (not shown) keeps the ink roll 94 pressed against the type-wheels 87, 88.

Between the end walls 5 and 6 three grooved rods 97 rotatably mount five internally toothed setting discs 98–102. The said discs are provided with peripheral recesses 103 engaged by projections 104 located on five setting arms 105–109 mounted displaceably in two guides 110–111.

On a shaft 112 are pivoted twenty-six keybars 113 which by action of springs 114 are held against a stop 115 in a guide plate 116 which, together with a guide plate 117, fixes the keybars 113 laterally. The setting arms 105–109 are provided with recesses of conventional type with which the keybars cooperate, in such a manner, that upon depressing a keybar 113 the settings arms 105–109 may or may not be displaced.

On a shaft 118 rotatably mounted between the end walls 3 and 4 five cams 119–123 are secured (FIGS. 1 and 3).

Cam 119 acuates an arm 124, via rolls 125 and 126 mounted rotatably on the arm, which carries out a reciprocating motion upon the turning of the cam. The arm 124 is pivoted on a pin 127 rigidly mounted in the end wall 4. The left-hand portion (in FIG. 3) of arm 124 is in the form of a rack sector 128 adapted to cooperate with the gear wheel 80 on the shaft 79.

Upon the rotation of the shaft 118, each of the two cams 120 and 121 actuates a printing hammer 129 and 130 respectively which are pivoted on a block secured on the bottom plate 1.

The cam 122 cooperates with a coupling arm 132 via a roll 133 mounted rotatably on the said coupling arm. The coupling arm 132 is pivoted on a pin 134 mounted in the end wall 3. At its left-hand end (in FIG. 3) the coupling arm 132 carries a coupling gear wheel 135 rotatably mounted on a pin 136 and adapted to couple together the coupling wheels 73 and 75.

Cam 123, when turned, actuates an arm 137 pivoted on a pin 138 mounted in the end wall 3, in such a manner that the arm 137 (in FIG. 3) first is turned in anti-clockwise direction by counter-action of a spring 139 mounted on a feed arm 140 which is pivoted on the arm 137 and thereby moves the feed arm 140 against a drive wheel 141 rigidly mounted on the drive shaft 30, and upon continued movement moves the drive wheel 141 one division, and upon completed movement locks the drive wheel 141 and thereby the drive shaft 30, in that the feed arm 140 is wedged between the drive wheel 141 and a stop 142 mounted on the end wall 3. The arm 137 is provided with a pivoted link 143 articulated with a detent 144 pivoted on the end wall 3. It is understood that the detent 144, which in FIG. 3 engages and locks the drive wheel 141, is turned in anti-clockwise direction when the cam 123 actuates the arm 137 via the link 143 to turn in anti-clockwise direction, and disengages from wheel 141 to allow it to be moved one step by the feed arm 140, and upon the return of the feed arm 140 enters the next tooth space in the drive wheel 141 and again locks the same.

The machine can be driven in a conventional way, which is not described here in detail.

The shaft 118 is caused to make one revolution for every machine operation by a motor 145 which via a gear and clutch 146 drives the shaft 118. The clutch 146 is effected to rotate the shaft 118 one revolution by depressing a keybar 113, in that the keybars 113 actuate a cradle comprising two arms 147 and 148 mounted on the shaft 112 and connected by a rod 149, which rod can be actuated by any of the keybars 113 to rotate the cradle 147, 148, 149 in clockwise direction. The arm 147 extends to the clutch 146 and actuates the same to rotate the shaft 118 through one revolution upon the depression of a keybar. For setting the pin-wheels in starting position, the pin-wheels are provided with the necessary number of letters 150 corresponding to the division in question, which letters can be read in a window 151 extending above the pin-wheels in a case 152 covering the machine.

The case 152 also includes a depression 153 provided with grooves, so that the setting discs 31 can be actuated from the outside. The feed arrangement for a paper-tape 154 whereon the clear text and the cipher are printed, is not shown as it is not of essential importance for illustrating the invention. Nor is the construction of the pin-wheels disclosed in detail, as they may be of conventional type.

In the following, the mode of operation of the machine is described. At first the pins of the pin-wheels are set in active or passive position, according to a predetermined scheme, and by means of the setting discs 31 the key agreed upon is set in the window 151, the setting discs 31 being turned in either direction. Since the shaft 30 is locked by the detent 144 engaging drive wheel 141, the pressure plate 34 will stand still when, for example, the first setting disc 31 is being turned. The gear wheel 23 is however, carried along since the balls 33 which lie somewhat immersed in the holes in the pressure plate, force the setting disc 31 and the gear wheel 23 to move some distance to the left (in FIG. 5) against the action of spring 35, and upon continued rotation to snap down into the next hole in the pressure plate 34, and so on for each step of adjustment.

The setting of the machine being made, the ciphering or deciphering operation can be started. By depressing a keybar 113 the cradle 147, 148, 149 is actuated in the manner described, so that the clutch of the machine is actuated and the motor commences to rotate the shaft 118 through one revolution.

Depression of a keybar 113 adjusts the setting arms 105-109 to the letter combination indicated by the symbol of the keybar 113, and thereby also adjusts the setting discs 98-102. The said setting discs are provided in a known manner with internal teeth providing recesses 155 arranged in such a manner, that upon the depression of a keybar 113 only one axially coinciding opening of the recesses appears, which opening allows a projection 156 on the probe member 92, under action of the spring 93, to engage the aligned recesses. Upon operation of the clutch 146 the shaft 118 starts to rotate, and cam 119 actuates the arm 124 via the rolls 125 and 126, which arm begins to rotate about the pin 127. Gear wheel 80 is actuated to rotate in clockwise direction (in FIG. 3) and to drive the shaft 79 in anti-clockwise direction. Through the friction couplings 81, 82, 84 the pinions 78 and 157 are rotated in clockwise direction (FIG. 3), and the pinion 78 drives the drive wheel 76 which is in rigid connection with the conical pinion 77. This pinion 77 meshes with the conical gear wheel 85 which thereby drives the shaft 86 to rotate in clockwise direction (FIG. 4). The probe member 92 mounted between the two discs 89 and 90 moves anti-clockwise until under action of the spring 93, its projections enter into the axially coinciding openings 155 which correspond to the depressed keybar 113. Hereby the probing member 92 and, thus, the shaft 86 as well as the conical gear 85, 77, the drive wheel 76 and the pinion 77 are stopped.

The position now occupied by the shaft 86 corresponds to the printing position for the type (corresponding to the keybar 113) which type is in printing position on the clear text wheel 88.

The clear text letter is now set in printing position on the clear text type-wheel 88. At the same time that the shaft 86 was rotated, in like manner also the shaft 56 was rotated in clockwise direction (FIG. 2) via the friction coupling 81, 82, 157 when the shaft 79 was rotated in anticlockwise direction (FIG. 3) by the sector 124. Thereby the discs 57 and 58 mounted on the shaft 56 are rotated and carry along the probing members 60-67 to move in anticlockwise direction (FIG. 2). The probing members 60-63 are turned against the anti-clockwise direction of motion (FIG. 2) in such a manner, that when the position of the recesses, depending on the actuation of the pin-wheels 8-14 via the arms 37, allows any of the probing members 60-63, under action of the associated spring 72, to enter any open recess combination, the shaft 56 will be stopped in this position and, as at the setting of the clear text letter, the friction coupling 81, 82, 157 will slip during the continued rotation of the shaft 79. Hereby a starting position of the displacement figure is determined.

After the setting of the clear text letter and of the starting position for the displacement figure, the cams 120, 122 and 123 become operative. Cam 120 which actuates the arm 130 and the printing hammer 129 directs the latter against a paper strip 158 and prints the clear text letter in question from the clear text type-wheel 88 on said strip. Cam 123 actuates the feed mechanism for the pin-wheels 8-14 in the aforedescribed manner to advance the wheels one step. Cam 122 actuates the coupling arm 132, so that said arm rotates in clockwise direction (FIG. 3) and moves the coupling gear wheel 135 into engagement with the coupling wheels 73 and 75, so that they are coupled together. The combination discs 42-53 now have assumed new positions, depending on the new position of the pin-wheels 8-14 subsequent to the feed.

Upon the continued movement of the arm 124 in clockwise direction (FIG. 3) the friction in the friction coupling 81, 82, 78 is overcome, and the coupling slips until the arm 124 has completed its movement. The rotation of the arm 124 is adjusted so that it can turn the shaft 79 one full revolution and thereby the shaft 86 somewhat more than one revolution.

Now the cam 119 actuates the arm 124 to move in the opposite or counterclockwise direction and shaft 56 is rotated in clockwise direction (FIG. 2) via the two friction couplings 81, 82, 78 and 81, 82, 157. The probing members 64-67 being turned against the clockwise direction tend to enter an open recess combination, and when one of the probing members 64-67 has so entered under action of its spring 72, the shaft 56 is stopped in this position, and the couplings 81, 82, 78 and 81, 82 and 157 slip until the arm 124 has returned to its starting position (FIG. 3). The angle through which the shaft 56 rotates from the starting position determined for the displacement figure during the first phase of the machine cycle corresponds to the actual displacement figure produced by the machine. This angular motion was also transferred by the rotation of the shaft 56 via the conical gear 77, 85 to the type-wheel pair 87, 88 which thereby rotates the corresponding number of character steps from the position of the clear text letter to the printing position for the cipher type-wheel 87. Upon arrival at this position, the cam 121 becomes operative and prints the cipher letter on the paper strip 158 via the arm 129 and printing hammer 130.

Immediately after the probing of the displacement figure, a second feed of the pin-wheels 8-14 is effected. The new position of the said pin-wheels is utilized in the next machine cycle for finding the starting position of the next displacement figure. Immediately before the end of the machine cycle, the coupling between the coupling wheels 73 and 75 is released in that the cam 122 actuates the arm 132 to rotate in anti-clockwise direction (FIG. 3). After the rotation of the shaft 118 by one revolution the coupling 135-136 is released and stops, to become again operative when a keybar 113 is being depressed.

For illustrating the different motion steps in a machine cycle, i.e., when the shaft 118 is rotated through one revolution, FIG. 10 which shows the motion scheme of the machine during a rotation of the shaft 118 through 360° is referred to.

As already mentioned, the shown embodiment of the invention provides thirty-two positions for stopping the shaft 56 in every direction of rotation with the said combination discs 42-53 and seven pin-wheels.

It is, however, possible to obtain other numbers of stop positions and, thereby, other numbers of possible displacement figures, if the number and construction of the combination discs is chosen in a suitable manner. The reason why in the shown embodiment of the invention the nbination discs were chosen with respect to their num-
and construction to provide thirty-two displacement
ires, is that the machine for reason of better clarity
uld be relatively simple in the design and number
the combination discs.
However, the design and number of the combination
cs, as also the number of pin-wheels may be varied
hin wide limits without leaving the scope of the
ention.

What we claim is:

1. In a ciphering machine of the type having a series
pin-wheels each having a number of pins displace-
le into active or passive position, the number of pins
the respective wheels of the series having no common
nominator, said wheels being mounted for simultaneous
tation through the angle between successive pin posi-
ns of each wheel, said machine having a clear text
phabet and a cipher text alphabet, and means operable
ring each machine cycle and controlled by said pin-
eels for displacing said cipher text alphabet relative
said clear text alphabet by an amount dependent upon
e setting of said pin-wheels, the improvement com-
ising, means rendering the displacement of said cipher
phabet dependent upon at least two settings of the
n-wheels, said means comprising, means settable in
cordance with said pin-wheel settings, first and second
eans for sensing the settings of said settable means,
id sensing means being respectively operable in oppo-
e directions, means under control of said first sensing
eans for determining the starting point for displacement
said cipher text alphabet relative to said clear text
phabet, means under control of said second sensing
eans for determining the amount of movement of said
pher text alphabet from said starting position, and
eans for stepping said pin-wheels and altering the set-
ng of said settable means between operations of said
nsing means.

2. A ciphering machine as claimed in claim 1 wherein
eans are provided for operating said pin-wheel step-
ing means twice during each machine cycle, the first
aid stepping occurring after sensing by said first sensing
eans during rotation of said shaft in one direction and
e second said stepping occurring after sensing by said
econd sensing means during rotation of said shaft in the
pposite direction.

3. A ciphering machine in accordance with claim 1
vherein said settable means comprises at least one in-
ernally toothed disc for each pin-wheel, said disc being
perable to one of two positions, in dependence upon
he position of the corresponding wheel and the setting
of the cooperating pin in active or passive position, said
liscs being axially aligned, and wherein said sensing
neans comprises notched code bars, a sensing shaft,
neans mounting said code bars on said shaft for rotation
herewith, said shaft extending through said axially aligned
discs, means urging the code bars of said first sensing
means to engage the tooth spaces of said discs when said
shaft rotates in a first direction, means urging the code
bars of said second sensing means to engage said disc
tooth spaces when said shaft rotates in the opposite direc-
tion and means frictionally driving said shaft in both
directions, said friction driving means also frictionally
driving said alphabets, said alphabets being provided on
the peripheries of corresponding wheels, means opera-
tive during sensing by said first sensing means to set said
clear text alphabet wheel in a predetermined position and
said shaft in said starting position, and means directly
coupling said alphabet wheels and said shaft for driving
said friction driving means to thereby displace said alpha-
bet wheels to a final displacement position under control
of said second sensing means.

4. A ciphering machine as claimed in claim 3 wherein
said means for predetermining the position of said alpha-
bet wheels comprises a series of key levers, a series of
permutation members operated by said levers and a sens-
ing probe mounted for movement relative to said permu-
tation members and urged to engage notches in said
members during movement in one direction, said sensing
probe being frictionally coupled to said alphabet wheels
during sensing by said first sensing means.

5. A ciphering machine as claimed in claim 3 wherein
said friction driving means comprises a motor, a single
revolution clutch, a drive shaft driven by said clutch, an
auxiliary shaft, means driven by said drive shaft for
oscillating said auxiliary shaft, and means individually
frictionally coupling said auxiliary shaft to said sensing
shaft and to said alphabet wheels and wherein said cou-
pling means comprises means driven by said drive shaft
for directly coupling said sensing shaft and said alphabet
wheels for drive by one of said frictional coupling means.

6. A ciphering machine as claimed in claim 5 wherein
the pin-wheel stepping means comprises a shaft mounting
the pin-wheels, a gear on said shaft and a pawl actuated
by said drive shaft to advance said pin-wheel shaft at
least once during each machine cycle.

7. A ciphering machine as claimed in claim 6 wherein
said pawl actuating means comprises a cam on said drive
shaft, a pivoted lever having a cam follower engaging
said cam and means pivotally mounting said pawl on said
lever in position to engage said gear and advance said
pin-wheel shaft through one step of movement.

8. A ciphering machine as claimed in claim 7 wherein
said pin-wheel advancing the cam has two lobes to thereby
cause two stepping movements of said pin wheels during
each machine cycle.

References Cited

UNITED STATES PATENTS

| | | | |
|---|---|---|---|
| 1,846,105 | 2/1932 | Hagelin | 197—4 |
| 1,921,327 | 8/1933 | Schimmel et al. | 197—4 |
| 2,079,130 | 5/1937 | O'Brien | 197—4 |
| 2,089,603 | 8/1937 | Hagelin | 197—4 |
| 2,247,170 | 6/1941 | Hagelin | 197—4 |
| 2,515,492 | 7/1950 | Buckley | 197—4 |
| 2,525,941 | 10/1950 | Potts | 197—4 |
| 2,753,034 | 7/1956 | Hell | 197—4 |
| 2,765,364 | 10/1956 | Hagelin | 197—4 XR |
| 2,969,135 | 1/1961 | Felin | 197—4 |

ROBERT E. PULFREY, *Primary Examiner.*

E. S. BURR, *Assistant Examiner.*